United States Patent [19]
Nakagoshi et al.

[11] Patent Number: 5,594,868
[45] Date of Patent: Jan. 14, 1997

[54] PROCESSOR UNIT FOR A PARALLEL PROCESSOR SYSTEM DISCARDS A RECEIVED PACKET WHEN A RECEPTION BUFFER HAS INSUFFICIENT SPACE FOR STORING THE PACKET

[75] Inventors: Junji Nakagoshi, Hadano; Tatsuo Higuchi, Fuchu; Shinichi Kato, Yokohama; Toshimitsu Ando, Isehara; Masaaki Iwasaki, Tachikawa, all of Japan

[73] Assignee: Hitachi, Ltd., Tokyo, Japan

[21] Appl. No.: 407,853

[22] Filed: Mar. 21, 1995

[30] Foreign Application Priority Data

Mar. 24, 1994 [JP] Japan ................................. 6-053406

[51] Int. Cl.⁶ ............................. G06F 13/14; G06F 15/16; G06F 15/163
[52] U.S. Cl. ................... 395/200.16; 395/877; 370/389; 370/230
[58] Field of Search ................... 395/859, 200.16, 395/200.2, 877, 200.9, 250; 364/DIG. 1, DIG. 2; 370/60, 94.1, 13, 95.1; 375/200

[56] References Cited

U.S. PATENT DOCUMENTS

| | | | |
|---|---|---|---|
| 5,184,347 | 2/1993 | Farwell et al. | 370/94.1 |
| 5,208,912 | 5/1993 | Nakayama et al. | 395/859 |
| 5,280,498 | 1/1994 | Tymes et al. | 375/200 |
| 5,319,638 | 6/1994 | Lin | 370/94.1 |
| 5,390,299 | 2/1995 | Rege et al. | 395/250 |
| 5,459,723 | 10/1995 | Thor | 370/60 |

OTHER PUBLICATIONS

"Routing Method for Interconnecting Network of Parallel Computers AP1000", Proceedings of the Institute of Electronics, Information and Communications Engineers of Japan, D–1, vol. J75–D–1, No. 8, pp. 600–606. (Inftercon-nection Network Routing scheme for the AP1000).

"High Speed Message Handling Mechanism", Proceedings of the Information Processing Society of Japan, vol. 34, No. 4, pp. 638–646 (Low–Latency message communication support for the AP1000).

*Primary Examiner*—Daniel H. Pan
*Attorney, Agent, or Firm*—Fay, Sharpe, Beall, Fagan, Minnich & McKee

[57] ABSTRACT

A parallel processor system includes: a reception buffer pointer controller for generating an address of a reception buffer area in which a received packet is written and for checking whether there is no space area in the reception buffer area; a discard command bit capable of being set and reset by an instruction processor; a received packet discard judging unit for judging from the discard command bit and information supplied from the reception buffer pointer controller, whether the received packet is written, suspended, or discarded; and a reception controller for controlling to write the received packet in the reception buffer area in accordance with an judgement by the received packet discard judging unit. With this arrangement, even if there is no space area in the reception buffer area for storing a received packet or even if the received packet cannot be received because of a failure in the reception processor unit, the received packet can be discarded at the reception processor unit.

18 Claims, 12 Drawing Sheets

FIG.14

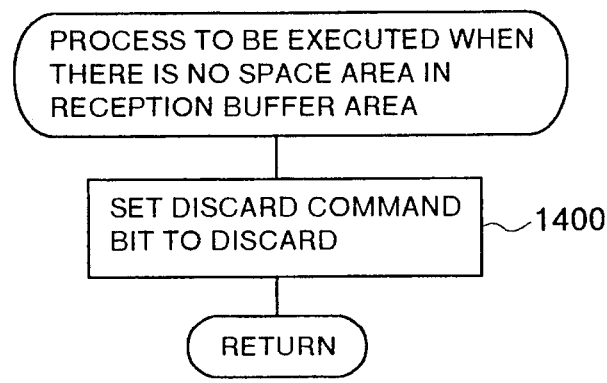

FIG.15

| INPUTS TO RECEIVED PACKET DISCARD JUDGING UNIT 140 | | OUTPUTS OF RECEIVED PACKET DISCARD JUDGING UNIT 140 | | | |
|---|---|---|---|---|---|
| OUTPUT OF DISCARD COMMAND BIT 135 | OUTPUT OF RECEPTION BUFFER POINTER CONTROLLER 135 | MEANING | SIGNAL 225 | SIGNAL 226 | SIGNAL 227 |
| NOT DISCARD | SPACE AREA IN RECEPTION BUFFER AREA | WRITABLE IN RECEPTION BUFFER | 0 | 1 | 0 |
| | NO SPACE AREA IN RECEPTION BUFFER AREA | NOT WRITABLE IN RECEPTION BUFFER, STAND BY WITH RECEIVED PACKET | 0 | 0 | 1 |
| DISCARD | IRRELEVANT TO SPACE AREA IN RECEPTION BUFFER AREA | DISCARD RECEIVED PACKET | 1 | 0 | 0 |

PROCESSOR UNIT FOR A PARALLEL PROCESSOR SYSTEM DISCARDS A RECEIVED PACKET WHEN A RECEPTION BUFFER HAS INSUFFICIENT SPACE FOR STORING THE PACKET

BACKGROUND OF THE INVENTION

1. Field of the Invention

The present invention relates to a parallel processor system, and more particularly to a parallel processor system suitable for reception control of a packet to be transferred between processor units and capable of controlling a received packet without intercepting transfer of other packets when there is no space area in a reception buffer.

2. Description of the Related Art

If a full crossbar switch network is used for a parallel processor system, a packet can be transferred between arbitrary processor units by using a minimum number of switch stages. However, a full crossbar switch network becomes difficult to be configured if the number of processor units increases. A multistage switch network is therefore often used in such a case.

Wormhole routing having latency less than store-and-forward is often used for network routing, as described in "Routing Method for Interconnecting Network of Parallel Computers AP1000", Proceedings of the Institute of Electronics, Information and Communications Engineers of Japan, D-I, Vol. J75-D-I, No. 8, at pp. 600–606. This wormhole routing does not establish whole paths for packet transfer, but it establishes a particular path (switch) only during the period while all packets including the start and end packets pass therethrough.

Packet reception control for a parallel processor system has been proposed as described in "High Speed Message Handling Mechanism", Proceedings of Information Processing Society of Japan, Vol. 34, No. 4, at pp. 638–646. With this technique, each message is received asynchronously by providing each processor unit with a ring buffer. The ring buffer is managed by a base register (BASE), a write pointer (WTP), and a read pointer (RDP). BASE indicates a start address of the ring buffer. WTP indicates an address at which next received data is written. RDP indicates an address to which a CPU accesses presently. CPU can write arbitrary data in RDP.

If both WTP and RDP indicate the same address, it means that the ring buffer has no space area. If they indicate the same address, an interrupt is issued to CPU to suspend reception of a packet until the ring buffer provides a space area.

With this conventional technique, if there is no space area in the ring buffer, an interrupt is issued to CPU and packet reception is suspended until the ring buffer provides a space area. However, this technique does not teach how a packet is processed which reached the processor unit under packet reception suspension. If reception suspension means that a received packet is caused to stand by at the input port of the processor unit, the packet stays resident on the network. In the case of wormhole routing, the packet stays resident on the network while establishing its path.

The conventional techniques do not take the above points into consideration. If there is any packet suspended at a path of one processor unit, another packet using this path cannot be transferred between other processor units. Therefore, the other packet is caused to stand by at the input port of the path until it becomes usable. Under traffics of frequent packet transfers, a number of packets are intercepted and cannot be transferred between processor units.

In another case, if a received packet cannot be written in a reception buffer because of failures of read circuits or read software, the path used by the packet cannot be used by other packets. Also in this case, a number of packets are intercepted and cannot be transferred between processor units.

SUMMARY OF THE INVENTION

It is an object of the invention to provide a data reception method whereby if a space area of a reception buffer cannot be reserved immediately, suspension of packet reception for a long time can be avoided, and a parallel processor system suitable for such a method.

It is another object of the present invention to provide a parallel processor system capable of preventing a number of packets from being suspended and becoming unable to be transferred between processor units if there occurs any failure in a reception operation.

The above objects can be achieved by discarding a packet which reached a processor unit if there is no space area in a reception buffer area. An instruction of discarding a received packet is performed by software if there is no space area in the reception buffer area, and by hard ware if a failure is detected. If a discard instruction is issued, the whole of a received packet to be written in the corresponding reception buffer area is discarded. If a space area is reserved in the reception buffer area, the discard instruction is deleted by software.

To this end, a reception control unit of a processor unit for performing a network reception process includes: various registers in a main storage for supervising the reception buffer area; a reception buffer pointer controller for supervising the various registers, generating an address of the reception buffer area at which a received packet is written, and detecting whether there is no space area in the reception buffer area; an instruction processor access controller; a FIFO for temporarily storing a packet received from the network; a FIFO controller for controlling the read/write of FIFO; a discard command bit (SC) capable of being set and reset by an instruction processor which executes an instruction; a received packet discard judging unit; and a reception controller for controlling to write a received packet. The various registers include a base register (RBR) for storing the start address of the reception buffer area, a header pointer register (RHPR) for storing the header pointer which indicates the header of an unused area of the reception buffer area 150 from which header a received packet is written, a tail pointer register (RTPR) for storing the tail pointer which indicates the tail of an unused area of the reception buffer area, and a size register (RSR) for storing the size data of the reception buffer area. The instruction processor access controller performs an access control for accessing the reception control unit from the instruction processor and generating an interrupt related to a reception process. The received packet discard judging unit judges from the discard command bit and data supplied from the reception buffer pointer controller whether the received packet is written, suspended, or discarded.

RBR, RHPR, RTPR, and RSR in the main storage for supervising the reception buffer area are initialized by the instruction processor via the instruction processor access controller. A packet received from the network is stored in FIFO under the control of the FIFO controller which in turn reports to the reception controller that there is data in FIFO.

In accordance with the contents of the discard command bit and a notice of a space area in the reception buffer supplied from the reception buffer pointer controller, the received packet discard judging unit judges in the following manner and instructs the reception controller to perform a particular operation. Namely, if the discard command bit indicates discard, the judging unit instructs not to write the received packet in the reception buffer but to discard it. If the discard command bit does not indicate discard, it is checked whether there is any space area in the reception buffer, and if there is a space area, the judging unit instructs that the received packet can be written in the reception buffer area. If there is no space area, the judging unit instructs not to write the received packet in the reception buffer area but to stand by while suspending it. If a failure is detected, the judging unit instructs to discard the received packet.

When the reception controller is reported from the FIFO controller that a packet has been received, it then follows an instruction from the received packet discard judging unit. If the judging unit instructs that the received packet can be written in the reception buffer area, the reception controller reads from the reception buffer pointer controller a reception buffer address at which the received packet is written. The reception controller reads the packet header from FIFO, and with reference to the transfer data length in the packet header, the packet is written in the reception buffer area while reading the transfer data from FIFO. After the received packet has been written in the reception buffer area, the reception controller supplies a report to this effect to the reception buffer pointer controller.

In response to this report of a write completion of the received packet, the reception buffer pointer updates RHPR and checks whether there is any space area in the reception buffer area. If there is no space area in the reception buffer area, an interrupt is issued to the instruction processor via the instruction processor access controller. A report to this effect is also supplied to the received packet discard judging unit.

If the received packet discard judging unit instructs to hold a received packet, the reception controller does not perform the reception process even if the packet has been received. The received packet is not subjected to the reception process but stays resident on the network.

If the received packet discard judging unit instructs to discard a received packet, the reception controller reads the packet from FIFO under the control of the FIFO controller, and with reference to the transfer data length in the packet header, the transfer data corresponding in amount to the transfer data length is not written but discarded. With this process, software executed by the instruction processor judges as if the packet has not been received.

In this manner, if there is no space area in the reception buffer area, a packet which reached the processor unit can be discarded in accordance with an instruction by software. Accordingly, packet transfers between other processor units on the network cannot be intercepted.

BRIEF DESCRIPTION OF THE DRAWINGS

FIG. 14 is a flow chart explaining the software process to be executed when there is no space area in a reception buffer area.

FIG. 15 explains the operation of the received packet discard judgement unit shown in FIG. 1.

DESCRIPTION OF THE PREFERRED EMBODIMENTS

Figure 1:
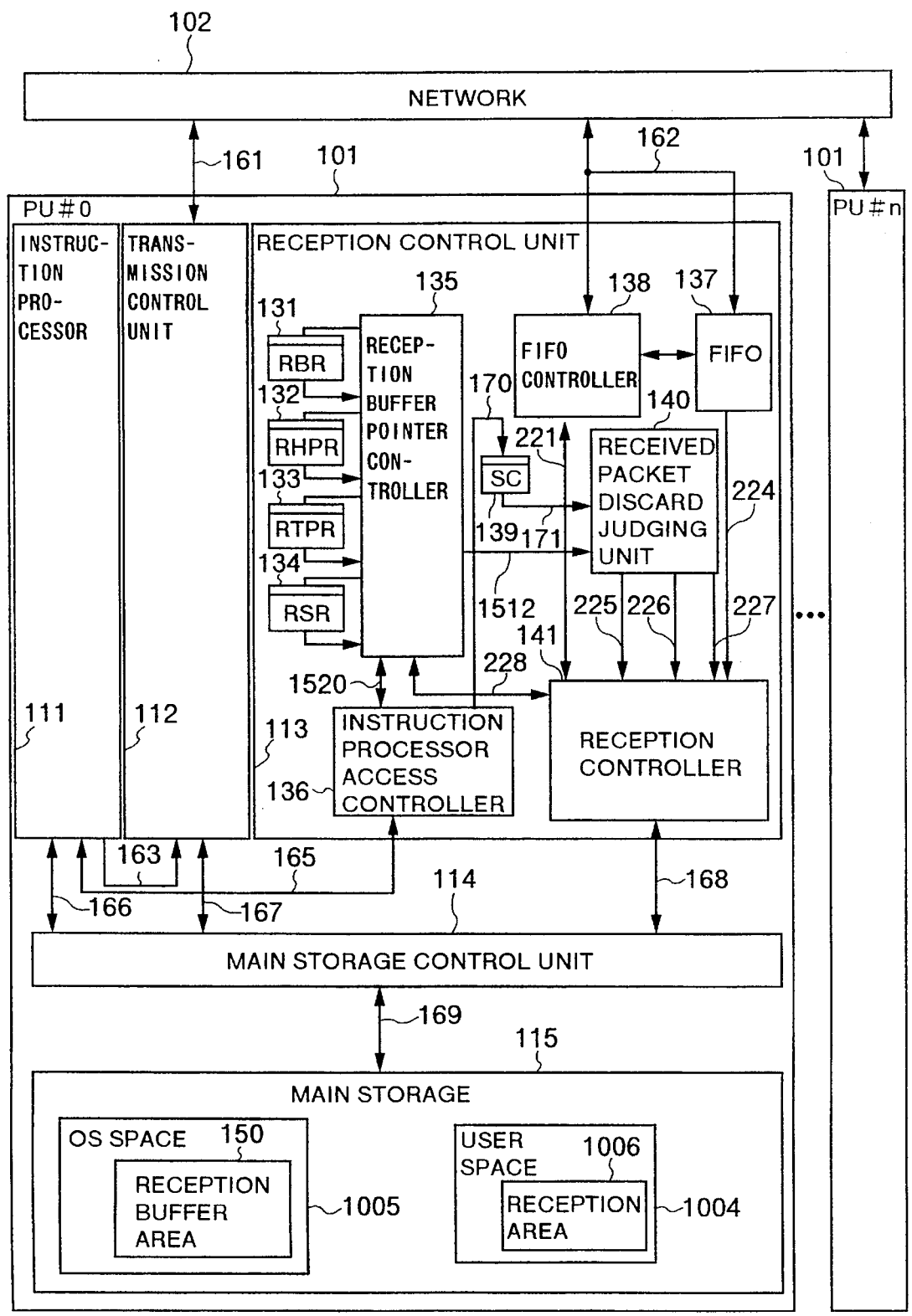
FIG. 1 is a block diagram showing the configuration of a parallel processor system according to an embodiment of the present invention.

An embodiment of the invention will be described with reference to FIG. 1 showing the configuration of a parallel processor system. In the parallel processor system, a plurality of processor units 101 (hereinafter represented by PU) are connected to a network for data transfer therebetween. In FIG. 1, only two PUs are depicted and others are omitted.

PU 101 is constituted by a processor 111 for executing an instruction (hereinafter called an instruction processor), a transmission control unit 112, a reception control unit 113, a main storage control unit 113, and a main storage 115. The transmission control unit 112 generates a packet and transmits it over the network 102 in response to an instruction from the instruction processor 111. The reception control unit 113 performs a reception process of a packet received from the network 102. The main storage control unit 114 performs an access control to the main storage 115 upon request from the instruction processor 111, transmission control unit 112, or reception control unit 114. The main storage 115 stores instructions to be executed by the instruction processor 111 and other necessary data.

The reception control unit 113 has a base register 131 (RBR), a header pointer register 132 (RHPR), a tail pointer register 133 (RTPR), and a size register 134 (RSR), respectively for managing a reception buffer area 150 in the main storage 115. Other constituent elements of the reception control unit 113 include a reception buffer pointer controller 135, an instruction processor access controller 136, a FIFO 137, a FIFO controller 138, a discard or scrap command bit 139 (hereinafter represented by SC), a received packet discard judging unit 140, and a reception controller 141. The reception buffer pointer controller 135 supervises RBR 131, RHPR 132, RTPR 133, and RSR 134 to generate an address of the reception buffer area 150 in which a received packet is written and to detect whether there is any space area in the reception buffer area 150. The instruction processor access controller 136 controls an access to the reception control unit 113 and interrupts the reception process at the control unit 113, respectively via a signal line 165. FIFO 137 is a register group for temporarily storing packets received from the network 102. The FIFO controller 138 controls read/write addresses of FIFO 137. The discard command bit 139 can be set/reset by the instruction processor 111 under the control of the instruction processor access controller 136. The received packet discard judging unit 140 judges from SC 139 and information from the reception buffer pointer controller 135, whether a received packet is written in the reception buffer area 150 or discarded. The reception controller 141 controls to write a received packet in the reception buffer area 150.

Figure 3:
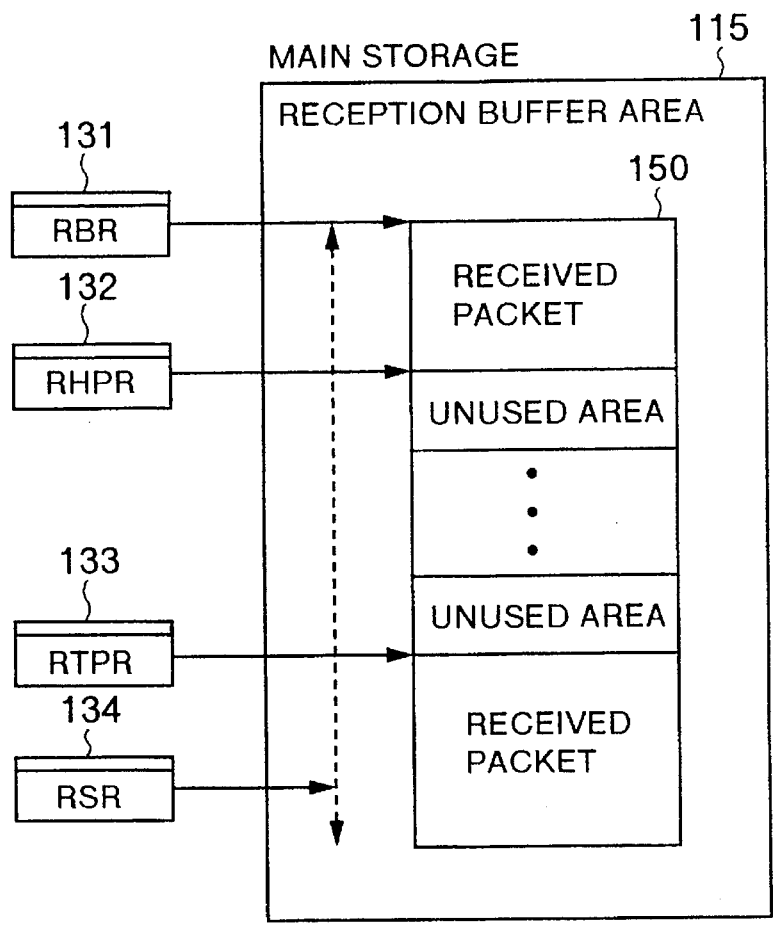
FIG. 3 shows the details of the reception buffer area of the embodiment shown in FIG. 1.

An example of the reception buffer area 150 in the main storage 115 is shown in FIG. 3. The base register (RBR) 131 stores the start address of the reception buffer area 150. The header pointer register (RHPR) 132 stores the header pointer for indicating the header of an unused area of the reception buffer area 150 from which header a received packet is written. Each time a packet is received, RHPR 132 is updated by the reception buffer pointer controller 135. The tail pointer register (RTPR) 133 stores the tail pointer for indicating the tail of an unused area of the reception buffer area 150, an arbitrary value being written in RTPR by the instruction processor. The size register (RSR) 134 stores the size data of the reception buffer area 150.

Figure 16:
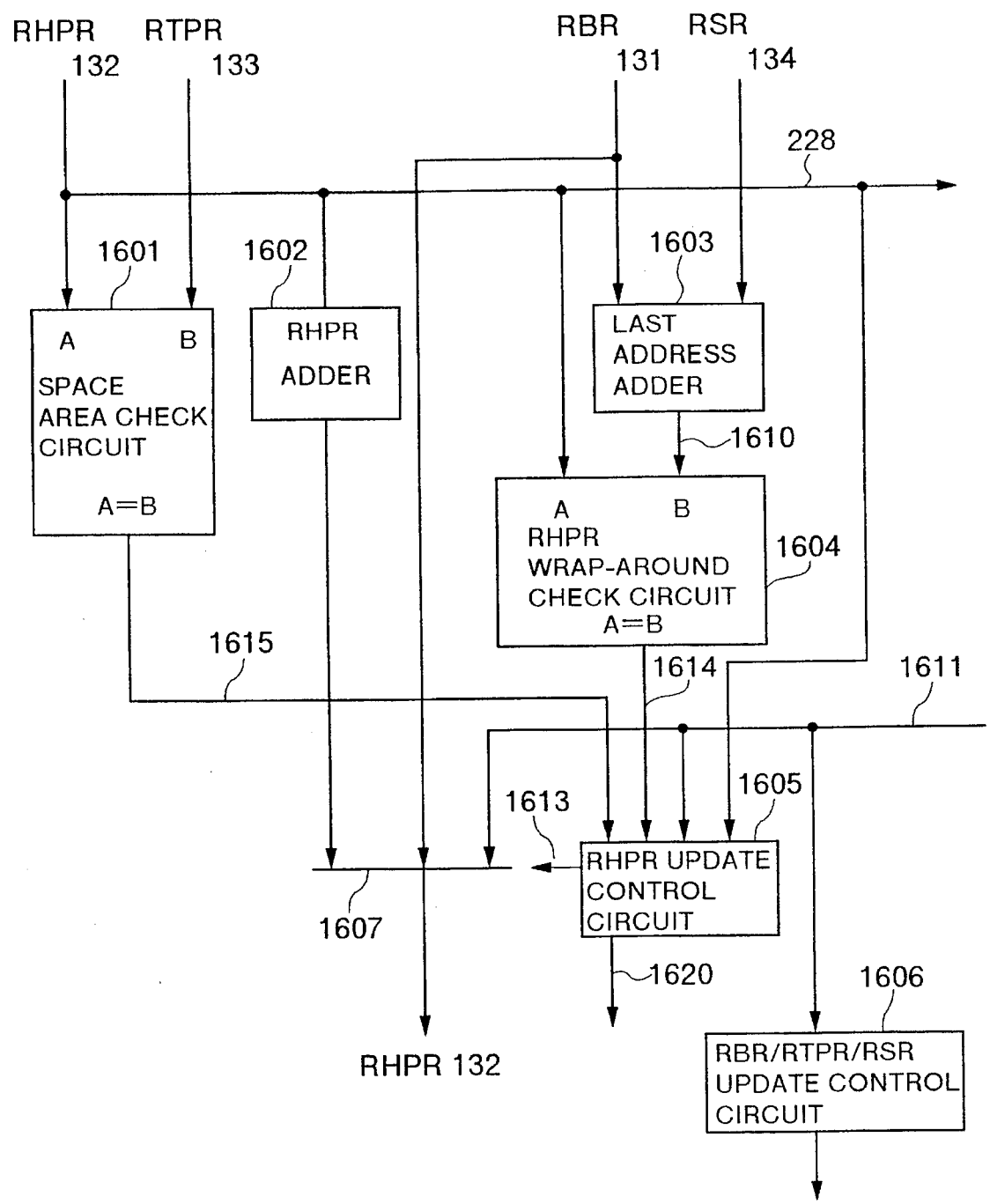
FIG. 16 is a block diagram showing the structure of the reception buffer pointer controller shown in FIG. 1.

FIG. 16 shows an example of the structure of the reception buffer pointer controller 135. The reception buffer pointer controller 135 is constituted by a space area check circuit 1601, an RHPR adder 1602, a last address adder 1603, an RHPR wrap-around check circuit 1604, an RHPR update control circuit 1605, and a reception buffer update control circuit 1606. The space area check circuit 1601 compares the outputs of RHPR 132 and RTPR 133 to detect whether there is no space area in the reception buffer area 150. The RHPR adder 1602 adds an output of RHPR 132 to a packet length to determine the next reception buffer area. The last address adder 1603 adds the outputs of RBR 131 and RSR 134 together to determine the last address of the reception buffer area. The RHPR wrap-around check circuit 1604 compares an output 1610 of the last address adder 1603 with an output of RHPR 132 to check whether the address stored in RHPR 132 is the last address of the reception buffer area. The RHPR update control circuit 1605 responds to an update request from the instruction processor access controller 136 and reception controller 141, and controls a selector 1607 to determine update data of RHPR 132. The reception buffer update control circuit 1606 responds to an update request from the instruction processor access controller 136, and updates RBR 131, RTPR 139, and RSR 134.

In this embodiment of the invention, prior to a transmission/reception process, an operating system (hereinafter represented by OS) initializes RBR 131, RHPR 132, RTPR 133, and RSR 134. Specifically, the instruction processor 111 issues a request via the signal line 165 to the instruction processor access controller 136. The instruction processor access controller 136 analyzes the request, and issues another request via a signal line 1611 to the RHPR update control circuit 1605 or reception buffer update control circuit 1606. In response to the request, each control circuit updates the corresponding register. An update request for RHPR 132 by the reception controller 141 is performed by a signal 228 in response to which the RHPR update control circuit 1605 controls the selector 1607 by using an output signal 1613 of the RHPR wrap-around check circuit 1604. If a signal 1614 indicates that the address stored in RHPR 132 is the last address of the reception buffer area, the RHPR update control circuit 1605 causes the selector 1607 to select the output of RBR 131 and set it to RHPR 132.

On the other hand, if the signal 1614 indicates that the address stored in RHPR 132 is not the last address, the selector 1607 selects the output of the RHPR adder 1602 and set it to RHPR 132. After RHPR 132 is updated, the RHPR update control circuit 1605 sends a signal 1620 via the instruction processor access controller 136 to the instruction processor 111 to issue an interrupt, if an output signal 1615 of the space area check circuit 1601 indicates that there is no space area. In the embodiment of the invention, the packet size is assumed to be fixed for the simplicity of description, although any size may be used.

Figure 10:
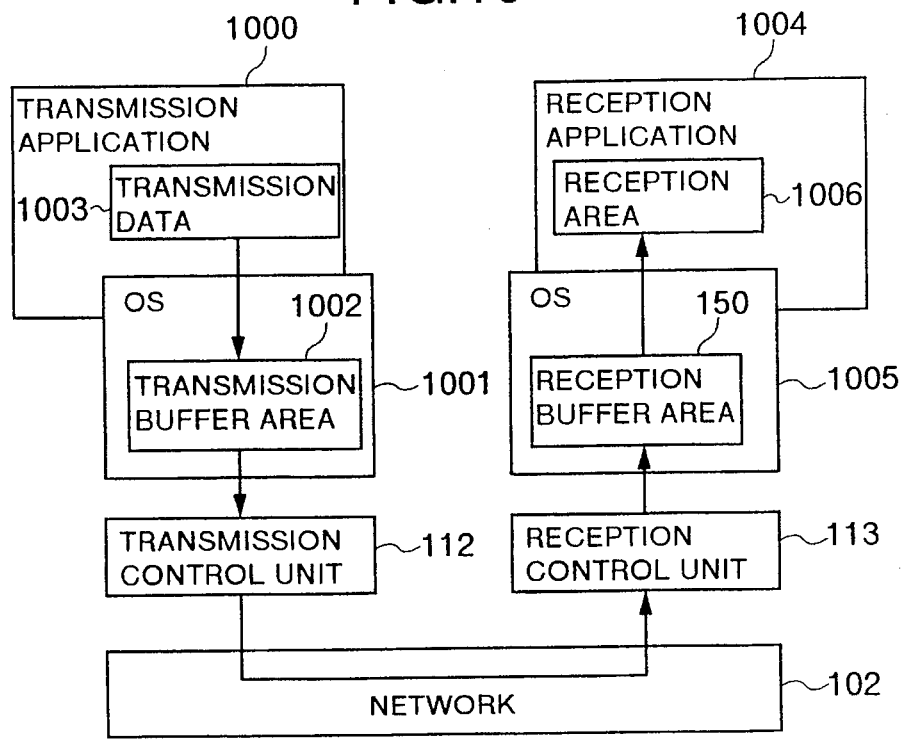
FIG. 10 is a flow chart explaining the packet transmission/reception process according to an embodiment of the invention.

Next, the operation of a software transmission/reception process will be described. An embodiment of a fundamental method of transmitting and receiving a packet between processor units will first be described with reference to FIG. 10. In this embodiment, when a transmission application 1000 running on a transmission PU issues a transmission request, transmission data 1003 designated by a user application is copied to a transmission buffer area 1002 in the space of OS 1001. OS 1001 passes the address of the transmission buffer area 1002 in which the transmission data was copied to the transmission control unit 112. In accordance with the passed address, the transmission control unit 112 reads the transmission data from the transmission buffer area 1002, generates a packet, and transmits it over the network 102. The packet is transferred to a destination reception PU over the network 102. When the reception control unit 113 of the reception PU receives the packet, it writes the packet in the reception buffer area 150 of the reception PU. When a reception user application 1004 requests the reception data, OS 1005 of the reception PU searches the reception buffer area 150. If the reception data requested by the reception user application 1004 has been already stored, the reception data is copied to a reception area 1006 of the reception user application 1004. In the above manner, a transmission/reception process is performed by using the transmission/reception areas of the user applications with the help of the transmission/reception buffer areas in the spaces of OSs.

A transmission process will be described next with reference to FIG. 11. The user application running on the transmission PU issues a transmission request to OS by using a reception PU number and a transmission data address (Step 1100). In response to the request, OS copies the transmission data designated by the user application to the transmission buffer area 1002 in the space of OS (Step 1101). OS passes the reception PU number and the address of the transmission buffer area 1002 to which the transmission data was copied, to the transmission control unit 112 (Step 1102). OS forms a transmission completion queue, stores the reception PU number and the transmission buffer area address in the queue to terminate the transmission process, and passes the control to the user application (Step 1103). The transmission completion queue is deleted when the reception PU reports a reception of the transmission data (hereinafter called an ACK packet).

Figure 12:
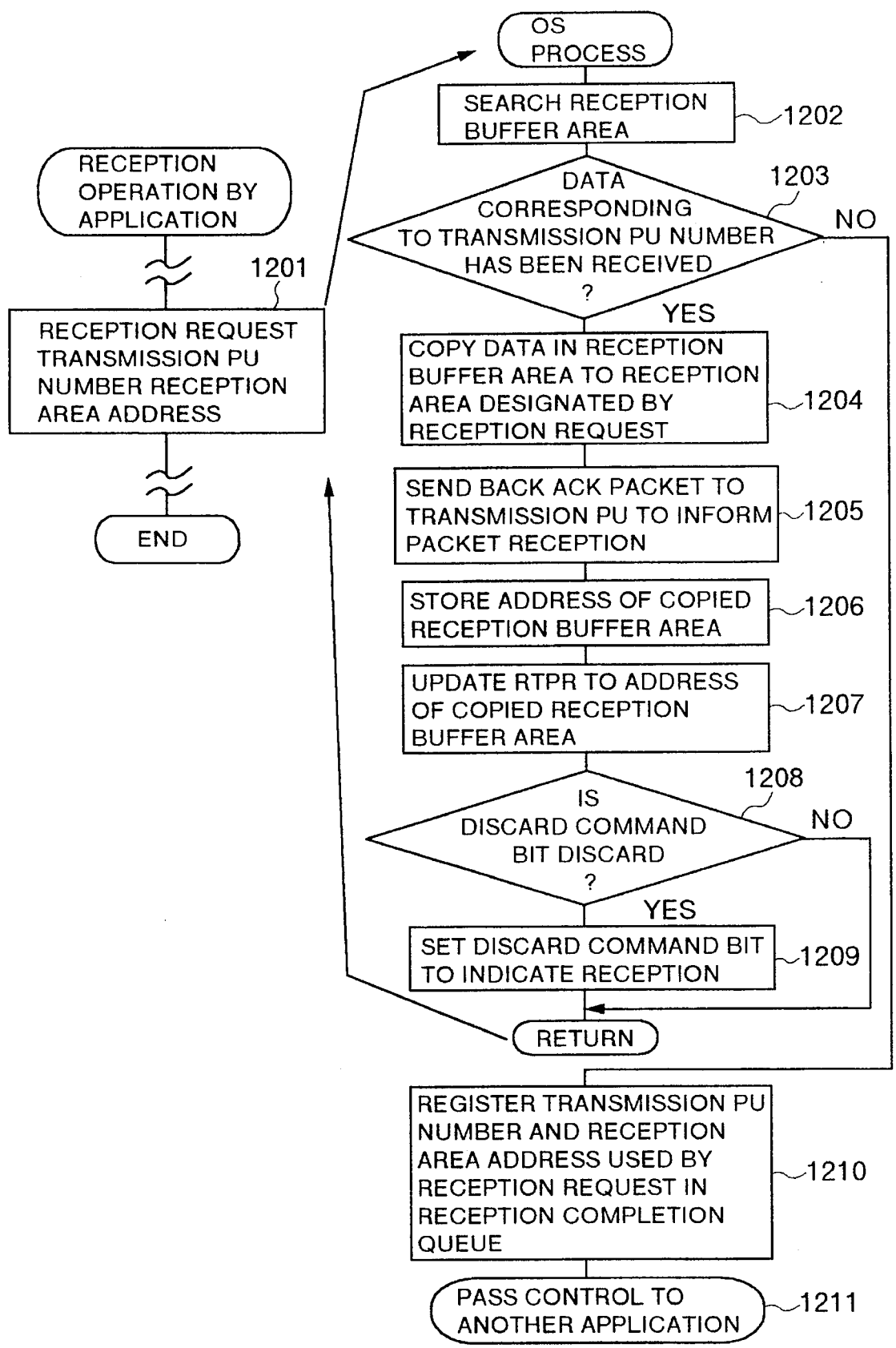
FIG. 12 is a flow chart explaining the software reception process according to an embodiment of the invention.

A reception process will be described next with reference to FIG. 12. The user application running on the reception PU issues a reception request to OS by using a transmission PU number and a reception area address (Step 1201). In response to the request, OS searches the reception buffer area 150 in the space of OS (Step 1202), and checks whether or not the packet corresponding to the transmission PU number designated by the user application has been received (Step 1203). If not, the transmission PU number and reception area address designated by the user application are registered in a reception completion queue managed by OS (Step 1210). The control is then passed to another user application different from the user application which issued the reception request (Step 1211). This reception completion queue is used in such a manner that when a packet is received from another processor unit, OS checks the reception completion queue, and if the packet corresponds to the contents registered in the queue, OS writes it in the reception area 1006 in accordance with the reception area address registered in the reception completion queue. The details of the reception completion queue will be later described.

If the packet corresponding to the transmission PU number designated by the user application has been received, the packet stored in the reception buffer area in the space of OS is copied to the reception area of the user application (Step 1204). In order to report a reception of the packet to the transmission PU, an ACK packet is generated in accordance with the transmission PU number stored in the received packet, and transmitted to the transmission PU (Step 1205). The address of the reception buffer area in the space of OS from which the packet was copied to the reception area 1006 of the user application, is stored (Step 1206). This stored address is used for generating a space area in the reception buffer area 150 in the space of OS if there is no space area. In order to generate a space area in the reception buffer area 150, OS updates RTPR 133 to the address of the copied reception buffer area 150 (Step 1207).

OS checks whether the reception control unit 113 has been instructed to discard the received packet because there is no space area in the reception buffer area 150 (Step 1208). If the reception control unit 113 has been instructed to discard the received packet, the discard command bit is set not to indicate discard but to indicate reception (Step 1209), and the control is passed to the user application. If discard has not been instructed, the control is directly passed to the user application.

In this embodiment, the reception buffer area 150 is configured so that received packets are written in the reception buffer area 150 at consecutive addresses. Therefore, the update process (Step 1207) of updating RTPR 133 to the address of the copied reception buffer area 150 in order for OS to generate a space area in the reception buffer area 150, is allowed only when the address of the reception buffer area in the OS space copied to the reception area 1006 of the user application is the same as the address consecutive to RTPR 133.

Figure 13:
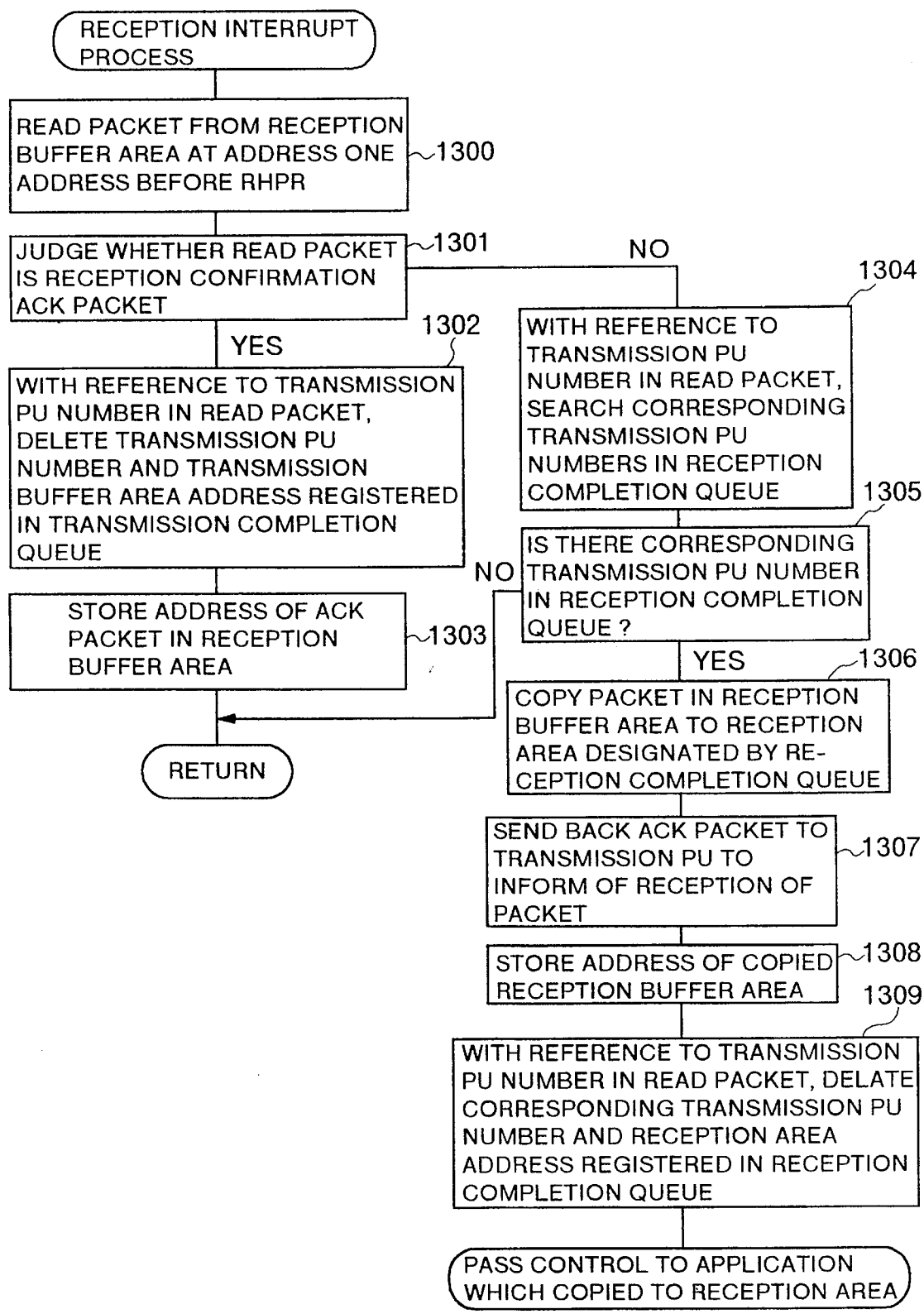
FIG. 13 is a flow chart explaining the software reception interrupt process according to an embodiment of the invention.

Next, the packet reception process by OS will be described with reference to FIG. 13. When OS is informed of a reception of a packet by an interrupt, it reads the address indicated by RHPR 132. The received packet is read from the reception buffer area at the address one address before RHPR 132 (Step 1300). It is checked whether the read packet is a reception confirmation ACK packet (Step 1301). For this confirmation, information indicating an ACK packet, for example, is added to the transfer data 405 of the packet. If the read packet is the ACK packet, with reference to the transmission PU number in the read packet, the corresponding transmission PU number and transmission buffer area address registered in the transmission completion queue are deleted (Step 1302). OS stores the address of the ACK packet in the reception buffer area 150 (Step 1303), and the control is passed to the user application. This stored address is used for generating a space area in the reception buffer area 150 in the space of OS if there is no space area.

If the read packet is not an ACK packet, with reference to the transmission PU number in the read packet, transmission PU numbers registered in the reception completion queue are searched (Step 1304) to check whether there is the corresponding transmission PU number (Step 1305). IF there is no corresponding PU number, the read packet is stored in the reception area designated by the reception completion queue (Step 1306). In accordance with the transmission PU number in the read packet, an ACK packet is sent back to the PU to inform a reception of a packet (Step 1307). Next, OS stores the address of the copied reception buffer area 150 (Step 1308). With reference to the transmission PU number in the read packet, the corresponding transmission PU number and reception area address registered in the reception completion queue are deleted (Step 1309), and the control is passed to the user application which copied to the reception area. In the above manner, the user application and OS perform the transmission/reception process.

Figure 4:
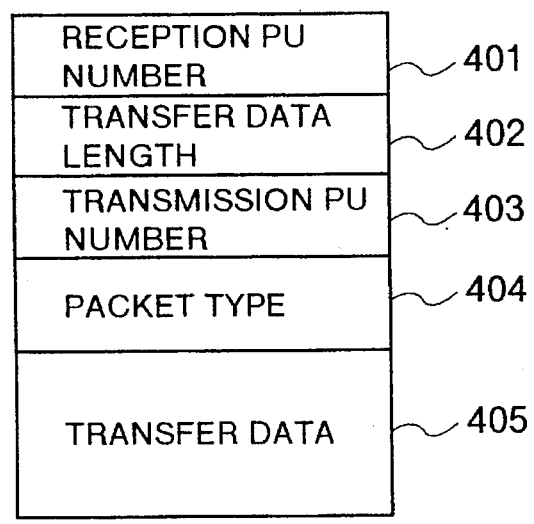
FIG. 4 shows an example of the format of a packet used by the embodiment shown in FIG. 1.

Next, the hardware operation of packet transfer between processor units will be described. Referring to FIG. 1, in the packet transmission process, the instruction processor 111 sends the reception PU number and transmission buffer area address to the transmission control unit 112 via the signal line 163. The transmission control unit 112 generates a packet and transmits via the signal line 161 over the network 102. The transmission control unit 112 generates a packet such as shown in FIG. 4. A packet is constituted by a reception PU number 401 indicating the identification number of the processor unit which receives the packet, a transfer data length 402 indicating the size of data to be transferred in the packet, a transmission PU number 403 indicating the identification number of the processor unit which transmitted the packet, a packet type 404 indicating the type of the packet, and transfer data 405. The packet on the network 102 is transmitted to a destination PU 101 in accordance with the header of the packet.

In the reception process, the packet received at the destination PU 101 from the network is stored in FIFO 137 via a signal line 162. At this time, the FIFO controller 138 checks the read/write addresses of FIFO 137 to confirm whether FIFO 137 has any space to write data. If there is no space, a report to this effect is returned via a signal line 162 to the network 162 which in turn stands by until data becomes writable in FIFO 137. In order to allow the packet to be written in FIFO 137, the reception controller 141 reads the packets already stored in FIFO 137.

The FIFO controller 138 reports via a signal line 221 to the reception controller 141 that a packet is in FIFO 137. In response to this report, the reception control unit 113 starts the reception process. In this reception process, the received packet discard judging unit 140 outputs a signal in the following manner in accordance with the discard command bit SC and a notice of a space area in the reception buffer area 150 supplied from the reception buffer pointer controller 135. Specifically, (1) if an output signal 171 of SC 139 does not indicate discard, then it is checked whether there is any space area in the reception buffer area 150, and if there is a space area and the received packet can be written in the reception buffer area 150, the received packet discard judging unit 140 outputs a signal 226 of level "1", whereas (2) if there is no space area and the operation is maintained while suspending the received packet, then the received packet discard judging unit 140 outputs a signal 227 of level "1". (3) If the output signal 171 of SC 139 indicates discard and the received packet is discarded without writing it in the reception buffer area 150, then the received packet discard judging unit 140 outputs a signal 225 of level "1".

In the following, the reception process will be described in each case of the signals (1) to (3) outputted from the received packet discard judging unit 140. Prior to the reception process, the instruction processor 111 initializes RBR 131, RHPR 132, RTPR 133, and RSR 134 respectively for supervising the reception buffer area 150.

(1) The case where the received packet discard judging unit 140 indicates that the reception buffer area 150 is writable.

Under the control of the FIFO controller 138, the packet received from the network 102 is stored in FIFO 137. All the data in a packet can not necessarily be stored in FIFO 137 depending upon the capacity of FIFO 137, and the remaining packet data stays on the network 101. The FIFO controller 138 reports via the signal line 221 to the reception controller 141 that there is a packet in FIFO 137.

Figure 2:
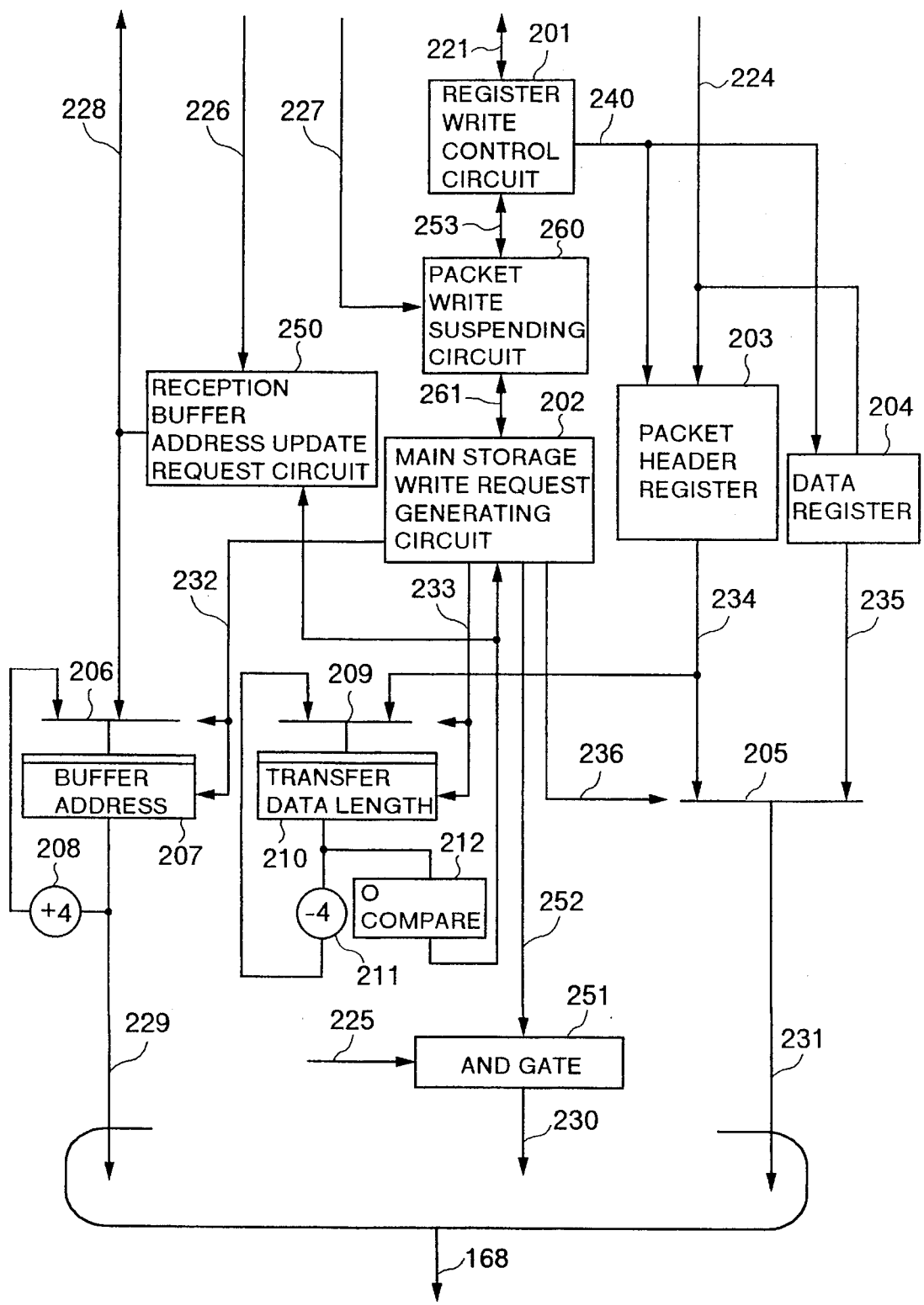
FIG. 2 is a block diagram showing the details of the reception controller of the embodiment shown in FIG. 1.

In the reception controller 141 shown in FIG. 2, upon reception of the report from the FIFO controller 138 via the signal line 221 that there is a packet in FIFO 137, a register write control circuit 201 reads a packet header via a signal line 224 and stores it in a packet header register 203.

The register write control circuit 201 reports via a signal line 253 to a packet write suspending circuit 260 that the packet header has been stored in the packet header register 203. Since the reception buffer area 150 is writable and the output signal 227 of "0" is supplied from the received packet discard judging unit 140 because this case is not that there is no space and the reception process stands by while suspending the received packet, the packet write suspending circuit 260 instructs via a signal line 261 a main storage write request generating circuit 202 to start writing the received packet in the main storage.

The main storage write request generating circuit 202 reads a reception buffer address via an output signal line 228 of the reception buffer pointer controller 135 in order to write the packet, and stores the address in a buffer address register 207 via a signal line 232. The main storage write request generating circuit 202 reads the transfer data length stored in the packet header register 203 via a signal line 234, and controls a selector 209 via a signal line 233 to store the transfer data length in a transfer data length register 210.

In accordance with the contents of the buffer address register 207, the main storage write request generating circuit 202 controls to write the packet header stored in the packet header register 203 in the main storage 115. In this write operation, the main storage write request generating circuit 202 controls a selector 205 by a signal 236 to select an output of the packet header register 203 as data 231 to be written in the main storage 115. As a write address 229 of the main storage 115, the contents of the buffer address register 207 are used. The main storage write request generating circuit 202 outputs as a request signal 230 a main storage write request signal 252 to the main storage control unit 114 at the same time when the address 229 or data 231 is outputted. An AND gate 251 outputs as the request signal 230 the main storage request signal 252 directly to the main storage control unit 114, because the reception buffer area 150 is writable and the output signal 225 of the received packet discard judging unit 140 is "0".

After the request signal 230 was outputted to the main storage control unit 114, the main storage write request generating circuit 202 updates the buffer address register 207 by an amount corresponding to the size data stored in the packet header, by using an adder 208 and a signal 232. The reception PU number, transfer data length, and the like stored in the packet header are each made of four bytes. Therefore, "4" is added to the buffer address register 207 by the adder 208 four times. The main storage control unit 114 is supplied with main storage addresses 229, main storage requests 230, and main storage data 231 four times.

Next, in accordance with the updated contents of the buffer address register 207, the main storage write request generating circuit 202 writes the transfer data in the main storage 115. In this write operation, the main storage write request generating circuit 202 reads data via the signal line 224, in corporation with the packet write suspending circuit 260 and register write control circuit 201, and stores it in the data register 204. The main storage write request generating circuit 202 controls the selector 205 via the signal line 236 to select an output 235 of the data register 204. The data in the data register 204 is outputted as the main storage write data 231 to the main storage control unit 114, together with the main storage write request 230 and main storage address 229. The AND gate 251 outputs as the request signal 230 the main storage request signal 252 directly to the main storage control unit 114, because the reception buffer area 150 is writable and the output signal 225 of the received packet discard judging unit 140 is "0".

The transfer data is transmitted from the transmission PU in the unit of four bytes. Each time the main storage write request generating circuit 202 outputs the main storage write request 252 to the main storage control unit 114, "4" is added to the buffer address register 207 by the adder 208. Similarly, "4" is subtracted from a transfer data length register 210 by a subtractor 211. The above operations are repeated by the main storage write request generating circuit 202 until the transfer data length register 210 takes a value of "0". Whether the value of the transfer data length register 210 is "0" or not is detected by a 0-comparator 212.

The main storage write request generating circuit 202 checks the 0-comparator to confirm whether or not all the transfer data of the received packet has been stored in the main storage. Since the reception buffer area 150 is writable and the output signal 226 of the received packet discard judging unit 140 is "1", a reception buffer address update request circuit 250 reports a reception completion of one packet to the reception buffer pointer controller 135 via the signal line 228 in response to a value of "0" of the 0-comparator 212.

Upon reception of the signal 228, the reception buffer pointer controller 135 updates RHPR 132, and checks whether or not there is any space area in the reception buffer area 150. If there is a space area, a report to this effect is supplied to the received packet discard judging unit 140. If there is no space area, a report to this effect is supplied to the instruction processor access controller 136 via a signal line 1520. The instruction processor access controller 136 issues an interrupt to the instruction processor 111 via the signal line 165, and at the same time the report is supplied to the received packet discard judging unit 140 via a signal line 1512.

(2) The case where the received packet discard judging unit 140 indicates that the output signal 171 of SC 139 does not show discard, there is no space area in the reception buffer area 150, and the reception process stands by while suspending the received packet.

When the FIFO controller 138 reports via the signal line 221 to the register write control circuit 201 that there is a packet in FIFO 137, the register write control circuit 201 instructs the FIFO controller 138 to read the packet header via the signal line 224 and store it in the packet header register 203, similar to the case wherein the received packet discard judging unit 140 indicates that the reception buffer area 150 is writable.

The register write control circuit 201 reports via the signal line 253 to the packet write suspending circuit 260 that the packet header has been stored in the packet header register 203. In response to this report, the packet write suspending circuit 260 does not instruct the main storage write request generating circuit 202 to start writing the received packet in the main storage, by using the signal line 261, because the output signal 227 of "1" of the received packet discard judging unit 140 indicates that there is no space area and the reception process stands by while suspending the received packet.

Since the packet write suspending circuit 260 does not instruct a write start, the main storage write request generating circuit 202 does not perform any operation. The packet write suspending circuit 260 stands by until the instruction processor 111 issues any instruction. Specifically, since there is no space area in the reception buffer area 150, the reception buffer pointer controller 135 instructs the instruction processor access controller 136 to issue an interrupt to the instruction processor 111, and the reception process is suspended until OS running on the instruction processor 111 supplies an instruction to process the received packet.

If there is no space area in the reception buffer area 150, OS instructs to set discard to SC 139 as shown in FIG. 14 (Step 1400).

In this embodiment of the invention, if there is no space area in the reception buffer area 150, OS instructs to set discard immediately after an interrupt is issued. Discard may no be set immediately after an interrupt is issued. For example, upon reception of an interrupt, discard is not instructed but a timer is set to pass the control to the user application. If the user application does not perform a reception process during the predetermined time set by the timer, then discard is instructed.

(3) As shown in FIG. 14, in response to an interrupt because of no space area in the reception buffer area 150, OS sets discard to SC 139 (Step 1400). In response to this, the received packet discard judging unit 140 instructs the reception controller 141 not to write the received packet in the reception buffer area 150 but to discard it.

In response to this instruction by the received packet discard judging unit 140 that the received packet is not written in the reception buffer area 150 but is discarded, the reception controller 141 performs the following process. First, the packet write suspending circuit 260 instructs via the signal line 261 the main storage write request generating circuit 202 to start the write disabled operation of the received packet into the main storage, because the received packet is not written in the reception buffer area 150 but is discarded and so the output signal 227 of the received packet discard judging unit 140 is "0".

In response to the write disabled operation instruction from the packet write suspending circuit 260, the main storage write request generating circuit 202 reads the reception buffer address via the signal line 228 under the control of the reception buffer pointer controller 135, and stores it in the buffer address register 207 in response to the signal 232. The main storage write request generating circuit 202 operates not to write the contents of the packet header register 203 into the main storage 115 but to discard the contents.

This discard is achieved by the AND gate 251 which suppress the request signal 230 to the main storage control unit 114, because the received packet is not written in the reception buffer area 150 but is discarded and so the output signal 225 of the received packet discard judging unit 140 is "1". Any data may be used as the address signal 229 and data signal 231 supplied to the main storage control unit 114.

Next, the main storage write request generating circuit 202 operates to discard the transfer data in the received packet. In this discard operation, the main storage write request generating circuit 202 reads the transfer data via the signal line 224 under the control of the register write control circuit 201, and stores it in the transfer data register 204. The main storage write request generating circuit 202 causes the selector 205 to select the output 235 of the data register 204, by using the signal line 236. The contents of the transfer data register 204 are outputted as the main storage write data 231 to the main storage control unit 114, together with the main storage write request 230 and buffer address 229. In this operation, the AND gate 251 suppresses the main storage write request signal 252 and does not output the request signal 230 to the main storage control unit 114, because the received packet is not written in the reception buffer area 150 but is discarded and so the output signal 225 of the received packet discard judging unit 140 is "1".

The main storage write request generating circuit 202 reads the transfer data from FIFO 137 and sets it to the data register 204. The main storage write request generating circuit 202 operates to subtract "4" from the transfer data length register 210 by using the subtractor 211 each time the transfer data of four bytes is discarded. The above operations of discarding the transfer data are repeated by the main storage write request generating circuit 202 until the contents of the transfer data length register 210 become "0". Whether the contents of the transfer data length register 210 are "0" is detected by the 0-comparator 212. When the main storage write request generating circuit 202 confirms from the 0-comparator 212 that all the transfer data of the received packet has been discarded, the reception process of one packet is completed.

The reception buffer update request circuit 250 does not report the reception completion of one packet to the reception buffer pointer controller 135, because the received packet is not written in the reception buffer area 150 but is discarded and so the output signal 226 of the received packet discard judging unit 140 is "0". The reception buffer pointer controller 135 does not therefore update RHPR 132.

If the received packet discard judging unit 140 has already indicated that the received packet is not written in the reception buffer area 150 but is discarded, at the time when the register write control circuit 201 reports via the signal 253 to the packet write suspending circuit 260 that a packet has been received, then the packet write suspending circuit 260 instructs via the signal line 261 the main storage write request generating circuit 202 to immediately perform the discard operation and start the write disabled operation of the received packet into the main storage.

If OS has set discard to the discard command bit, OS stands by until the user application performs a reception process. As the user application performs a reception process and if a space area can be formed in the reception buffer, RTPR 133 is updated and SC 139 is set not to be discard as explained with FIG. 12 (Step 1209). The received packet discard judgment unit 140 instructs the reception controller 141 to write the received packet in the reception buffer area. The process to be performed thereafter has been described in the above case (1).

Figure 11:
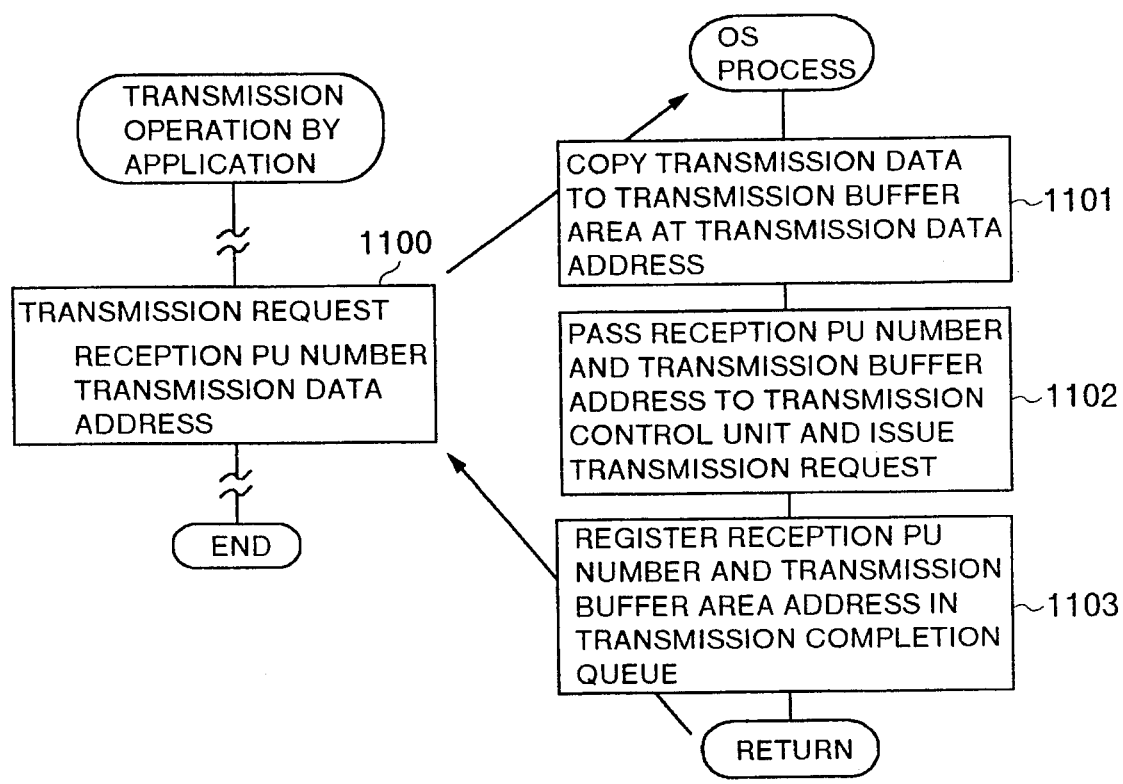
FIG. 11 is a flow chart explaining the software transmission process according to an embodiment of the invention.

OS of the transmission PU can re-transmit the discarded packet to the reception PU, while checking the reception PU number and transmission buffer area address stored in the transmission queue explained with FIG. 11. This re-transmission may be performed by OS if an ACK packet indicating the reception of a packet is not returned from the reception PU in a predetermined time period after the packet was transmitted.

In the above manner, if there is no space area in the reception buffer area 150, the packet reached the processor unit can be discarded in accordance with an instruction of OS.

In the above description, only one reception buffer area supervised by the reception control unit 113 of each PU 101 is provided. Packets transmitted over the same network include packets transmitted by a user application program (hereinafter called a general packet) and packets transmitted for controlling the whole of the parallel processor system (hereinafter called a control packet). If there is only one reception buffer area, both the types of packets are discarded. The control packet controls the whole of the parallel processor system so that discarding it is not proper. In order not to discard the control packet, it is necessary to prepare a network for control packets and another network for general packets. However, two networks increase the number of gates and are not suitable.

Figure 5:
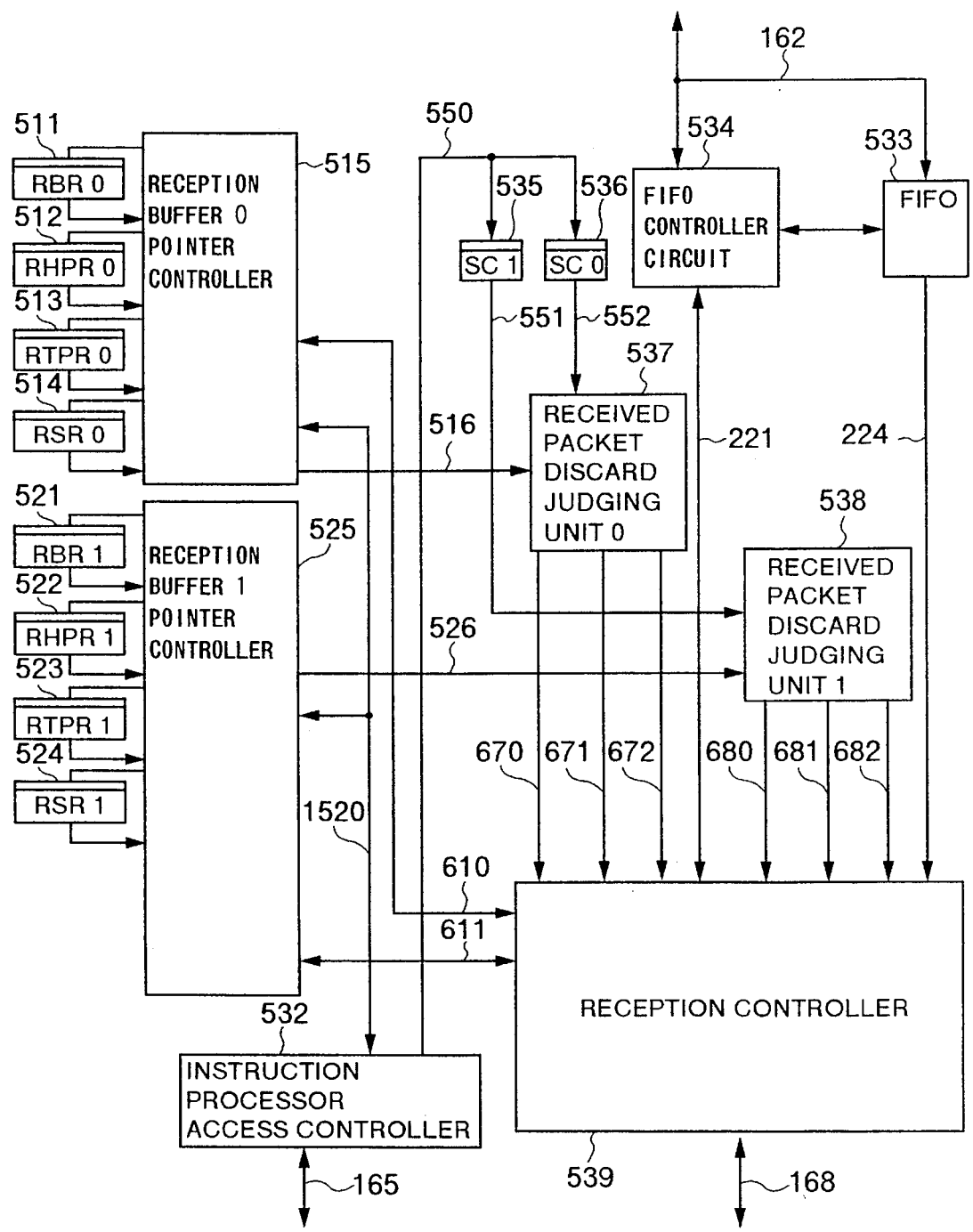
FIG. 5 is a block diagram showing the details of the reception control unit with two reception buffer areas according to another embodiment of the invention.

Two reception buffer areas are therefore provided as shown in FIG. 5, general packets being assigned one reception buffer area and control packets being assigned the other area. With this arrangement, control packets are not discarded even if there is no space area in the reception buffer area because of transfer of general packets. FIG. 5 shows only a reception control unit, and the other structure is the same as FIG. 1.

In the reception control unit shown in FIG. 5, two reception buffer areas (0) and (1) (shown in FIG. 7) are provided in the main storage 115, and each register is discriminated by adding a suffix (0) or (1) to the name of each register. The reception buffer area (0) is supervised by RBR(0) 511, RHPR(0) 512, RTPR(0) 513, RSR(0) 514, and a reception buffer (0) pointer controller 515, whereas the reception buffer area (1) is supervised by RBR(1) 521, RHPR(1) 522, RTPR(1) 523, RSR(1) 524, and a reception buffer (2) pointer controller 525. These functions are the same as described with FIG. 1.

For the reception buffer area (0), a discard command bit (0) 536 (hereinafter represented by SC(0)) is provided which can be set and reset by the instruction processor 111, and for the reception buffer area (1), a discard command bit (1) 535 (hereinafter represented by SC(1)) is provided which can be set and reset by the instruction processor 111.

Figure 7:
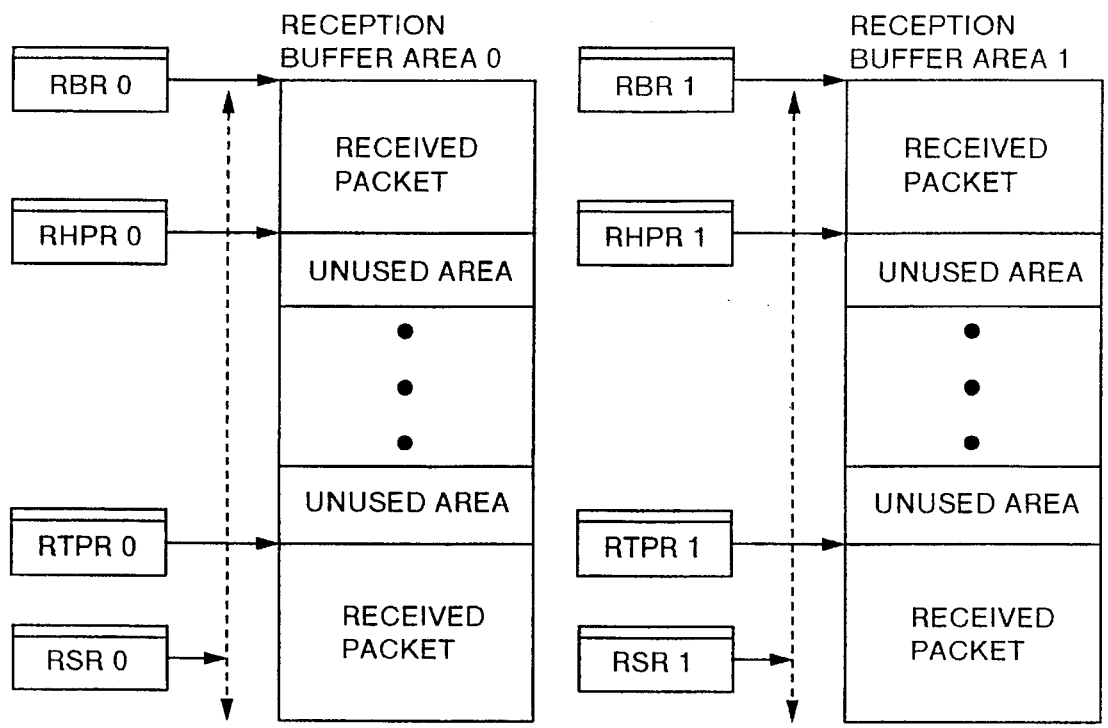
FIG. 7 show the details of the two reception buffer areas.

Examples of the reception buffer areas (0) and (1) formed in the main storage 115 are shown in FIG. 7. The function of each register is the same as explained with FIG. 3.

Figure 8:
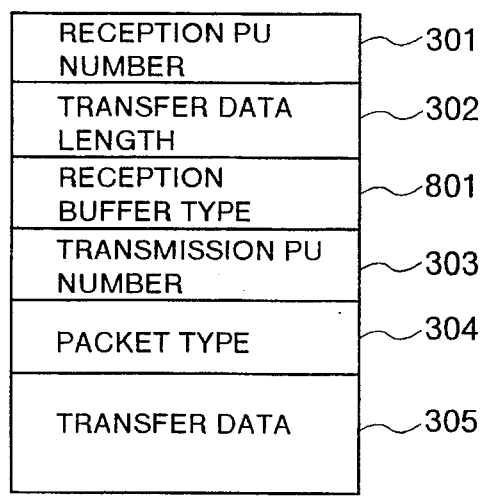
FIG. 8 shows an example of the format of a packet used by the embodiment shown in FIG. 5.

Next, the operation of packet transfer between processor units will be described. In the packet transmission process, the instruction processor 111 activates the transmission control unit 112. The transmission control unit 112 generates a packet and transmits it over the network 102. The transmission control unit 112 generates a packet such as shown in FIG. 8. A packet is constituted by a reception PU number 301 indicating the identification number of the processor unit which receives the packet, a transfer data length 302 indicating the size of data to be transferred in the packet, a reception buffer type 801 indicating which one of the two reception buffer areas is used for writing the packet, a transmission PU number 303 indicating the identification number of the processor unit which transmitted the packet, a packet type 304 indicating the type of the packet, and transfer data 305.

The packet on the network 102 is transmitted to a destination PU 101 in accordance with the reception PU number in the header of the packet. This process is the same as a conventional process.

In this reception process, similar to the description given with FIG. 15, the received packet discard judging unit (0) 537 outputs a signal in the following manner in accordance with the discard command bit SC(0) 536 and a notice of a space area in the reception buffer area (0) supplied from the reception buffer (0) pointer controller 515. Specifically, (1) if SC(0) 536 does not indicate discard, then it is checked whether there is any space area in the reception buffer area (0), and if there is a space area and the received packet can be written in the reception buffer area (0), the received packet discard judging unit (0) 537 outputs a signal 571 of level "1", whereas (2) if there is no space area and the operation is suspended while suspending the received packet, then the received packet discard judging unit (0) 537 outputs a signal 572 of level "1". (3) If SC(0) 536 indicates discard and the received packet is discarded without writing it in the reception buffer area (0), then the received packet discard judging unit (0) 537 outputs a signal 570 of level "1".

The received packet discard judging unit (1) 538 operates like the received packet discard judging unit (0) 537, in accordance with the discard command bit SC(1) 535 and a notice of a space area in the reception buffer area (1) supplied from the reception buffer (1) pointer controller 525.

The packet reception process by the received packet discard judging units (0) and (1) 537 and 538 is the same as the operation described with FIG. 1, excepting the following operation.

Figure 6:
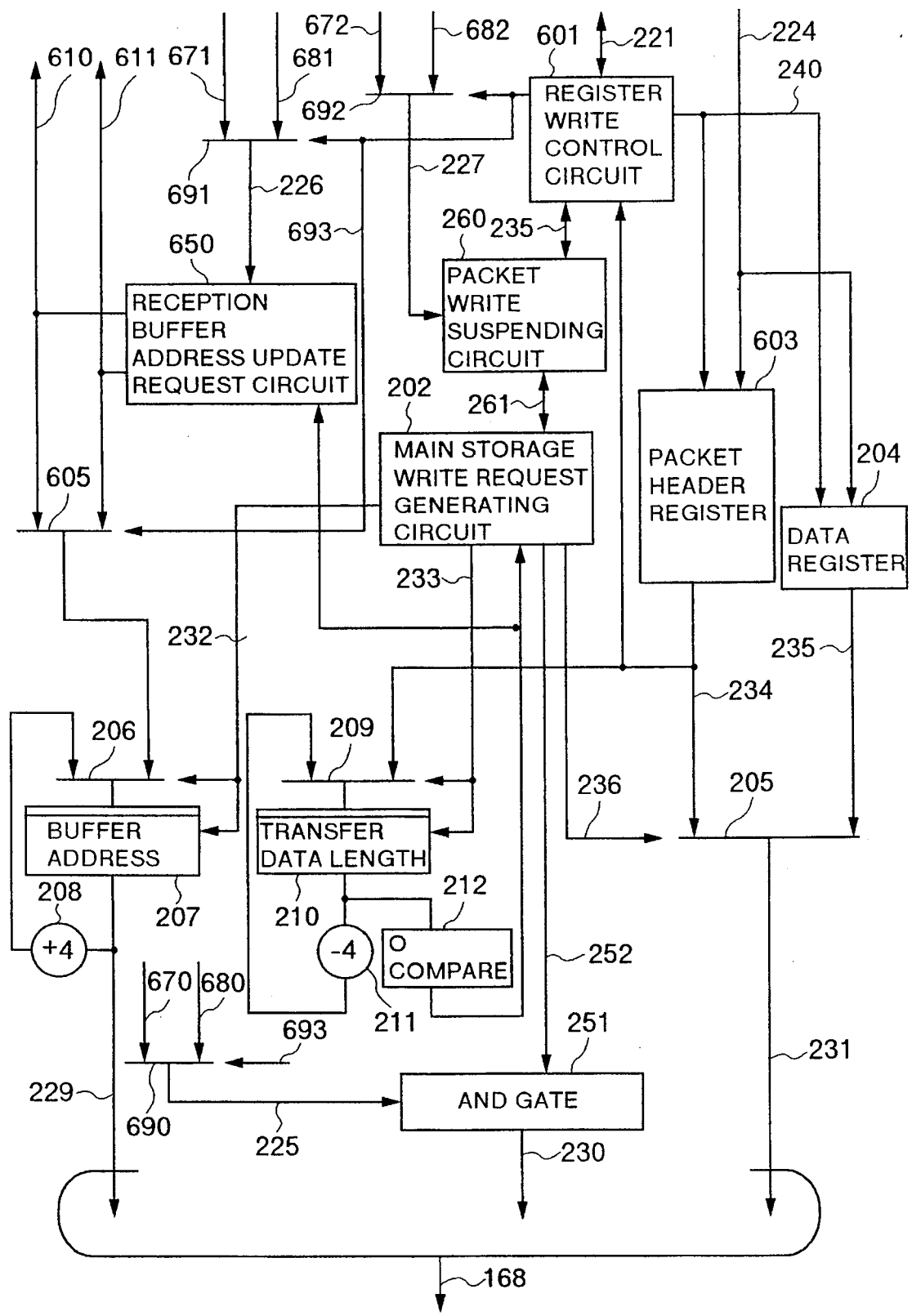
FIG. 6 is a block diagram showing the details of the reception controller used by the embodiment shown in FIG. 5 with two reception buffer areas.

In a reception controller 539 shown in FIG. 6, upon reception of the report from the FIFO controller 138 via the signal line 221 that there is a packet in FIFO 137, a register write control circuit 601 reads the packet header via the signal line 224 and stores it in a packet header register 603. The register write control circuit 601 reports via a signal line 253 to a packet write suspending circuit 260 that the packet header has been stored in the packet header register 603.

The register write control circuit 601 reads via a signal line 234 the buffer type stored in the packet header register 603. In accordance with the read buffer type, selectors 690, 691, and 692 are controlled via a signal line 693. If the buffer type indicates the reception buffer area (0), the selectors select signals 670, 671, and 672 outputted from the received packet discard judging unit (0) 537, whereas if the buffer type indicates the reception buffer area (1), the selectors select signals 680, 681, and 682 outputted from the received packet discard judging unit (1) 538.

In response to the report from the register write control circuit 601, the packet write suspending circuit 260 instructs via a signal line 261 the main storage write request generating circuit 202 to start the operation, in accordance with an output signal 227 of the received packet discard judging unit 538.

The main storage write operation by the packet write suspending circuit 260 and main storage write request generating circuit 202 is the same as described with FIG. 1. The operation of a reception buffer address update request circuit 650 is controlled by an output signal 226 of the received packet discard judging unit 538. If the received packet is written in the reception buffer area and an output signal 226 of the received packet discard judging unit 538 is level "1" and when the 0-comparator 212 takes a value of "0", a completion of a reception process of one packet is reported via a signal line 610 or 611 to the reception buffer pointer controller identified by the signal 693.

The process of receiving a packet whose buffer type is the reception buffer area (1) and thereafter receiving a packet whose buffer type is the reception buffer area (0) will be described, assuming that the process is performed under the conditions that the reception buffer area (1) has no space area and the received packet discard judging unit (1) 538 indicates discard of a received packet and that the reception buffer area (2) has a space area and the received packet discard judging unit (2) 537 indicates that a received packet is written in the reception buffer area (0).

When a notice of a packet in FIFO 533 is reported by the FIFO controller 534 via a signal line 221, the packet header is read via a signal line 224 and stored in the packet register 603. After the packet is stored in the packet register 603, the register write control circuit 601 reports this to the packet write suspending circuit 260 via a signal line 235. The register write control circuit 601 controls the selectors 690, 691, and 692 in accordance with the buffer type stored in the packet header register 603. In this example, the buffer type indicates the reception buffer area (1), and an output of the received packet discard judging unit (1) 538 is selected by a signal 693. Specifically, the selector 690 selects the signal 680, the selector 691 selects the signal 681, and the selector 692 selects the signal 682.

In response to the report from the register write control circuit 601, the packet write suspending circuit 260 instructs via a signal line 261 the main storage write request generating circuit 202 to start operation, because the received packet is to be discarded and the output signal 227 of the selector 692 is "0".

Similar to the operation described with FIG. 1, the main storage write request generating circuit 202 generates main storage requests for the whole of the packet header and transfer data. The main storage write request generating circuit 202 outputs a request signal 230 to the main storage control unit 114 via a signal line 252 at the same time when the buffer address 229 or packet data 231 is outputted. The AND gate 251 suppresses the main storage write request signal 252 and does not supply the request signal 230 to the main storage control unit 114, because there is no space area in the reception buffer area (1) and the received packet is discarded and because the output signal 225 of the selector 690 is "1". The reception buffer update request circuit 650 does not report a completion of a reception process of one packet to the reception buffer pointer controller 525, because the received packet is not written in the reception buffer area (1) but is discarded and because the output signal 226 of the selector 691 is "0".

Since the packet whose buffer type is the reception buffer area (0) followed by the packet whose buffer type is the reception buffer (1) is being stored in FIFO, the FIFO controller 534 reports via a signal line 221 to the register write control circuit 601 that the packet is in FIFO 533.

When a notice of a packet in FIFO 533 is supplied from the FIFO controller 534 via the signal line 221, the register write control circuit 601 stores the packet header in the packet header register 603 in the similar manner described earlier. The register write control circuit 601 controls the selectors 690, 691, and 692 in accordance with the buffer type stored in the packet header register 603. In this example, the buffer type indicates the reception buffer area (0), and an output of the received packet discard judging unit (0) 537 is selected by the signal 693. Specifically, the selector 690 selects the signal 670, the selector 691 selects the signal 671, and the selector 692 selects the signal 672. In response to the report from the register write control circuit 601, the packet write suspending circuit 260 instructs via a signal line 261 the main storage write request generating circuit 202 to start operation, because there is a space area in the reception buffer area (0) and the received packet discard judging unit (0) 537 indicates that the received packet can be written in the reception buffer area (0) and because the output signal 227 of the selector 692 is "0".

Similar to the operation described with FIG. 1, the main storage write request generating circuit 202 generates main storage request signals 230 for the whole of the packet header and transfer data. The main storage write request generating circuit 202 outputs the request signal 230 to the main storage control unit 114 via the signal line 252 at the same time when the buffer address 229 or packet data 231 is outputted.

The AND gate 251 does not suppress the main storage write request signal 252 and supplies the request signal 230 to the main storage control unit 114, because the received packet is written in the reception buffer area (0) and the output signal 225 of the selector 690 is "0". The reception buffer update request circuit 650 reports a completion of a reception process of one packet to the reception buffer pointer controller 515, because the received packet can be written not in the reception buffer area (1) but in the reception buffer area (0) and because the output signal 226 of the selector 691 is "1".

As described above, two reception buffer areas are provided to discard a received packet independently at each reception buffer area. Accordingly, a control packet used for controlling the whole of a parallel processor system can be adapted not to be discarded. In addition, it is not necessary to prepare a network for control packets and another network for general packets.

In the above embodiment of the invention, one packet forms one message, and each time one packet is received, a reception interrupt is issued. One message may be divided into a plurality of packets, and an interrupt may be issued when the last packet of the message is received.

In the above description, the instruction processor 111 instructs discard. Packets stay resident on the network and other packet transfers are intercepted if the normal reception process is not ensured. For example, the normal reception process cannot be ensured if an interrupt cannot be received by the abnormal operation of OS, or if a received packet cannot be written in the main storage by a failure in the main storage control unit.

More specifically, interruption of other packet transfers to be caused by the abnormal operation of OS occurs if there is no space area in the reception buffer area and an interrupt is issued to the instruction processor, and if an instruction for processing a received packet is not returned from OS. Interruption of other packet transfers to be caused by a failure in the main storage write control unit occurs if a main storage write request is not received by the main storage control unit and a received packet is not written in the main storage.

Figure 9:
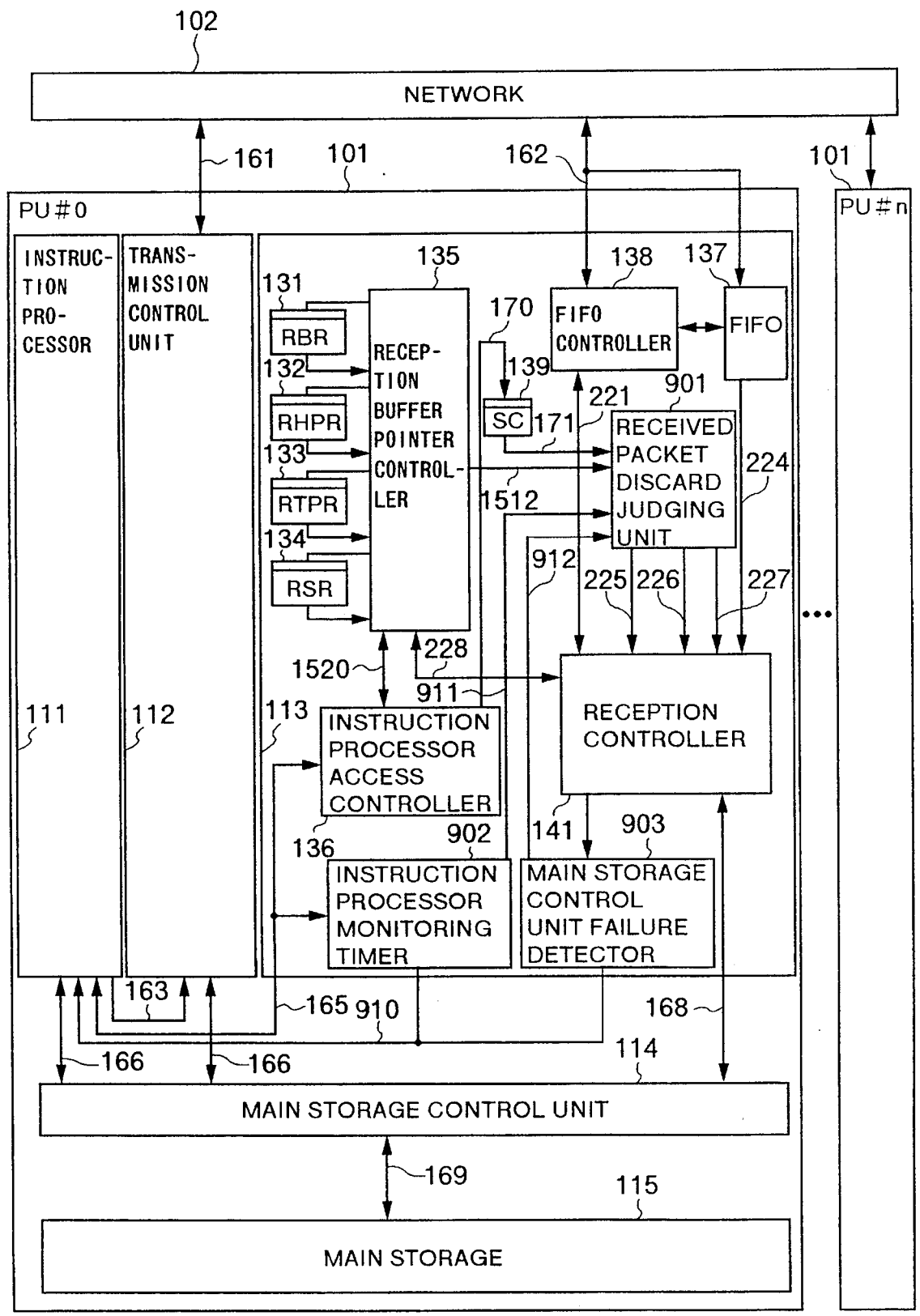
FIG. 9 is a block diagram showing the structure of a parallel processor system according to another embodiment of the invention.

In order to solve the above problems, the reception control unit is provided with a received packet discard judging unit 901, an instruction processor monitoring timer 902, and a main storage control failure detector 903, as shown in FIG. 9. The other structures are the same as FIG. 1.

In accordance with the contents stored in SC 139, a notice of a space area in the reception buffer supplied from a reception buffer pointer controller 135, a signal 911 indicating an abnormal OS supplied from the instruction processor monitoring timer 902, and a signal 912 indicating a failure in the main storage control unit 114 supplied from the main storage control unit failure detector 903, the received packet discard judging unit 901 performs the following operations. (1) If SC 139 does not indicate discard, if the signal 911 does not indicate an abnormal OS, and if the signal 912 does not indicate a main storage control unit failure, then it is checked whether there is any space area in the reception buffer area, and if there is a space area, the judging unit 901 instructs that the received packet is allowed to be written in the reception buffer area. (2) If the above conditions are satisfied except that there is no space area, then the operation stands by while suspending the received packet. (3) If SC 139 indicates discard, if the signal 911 indicates an abnormal OS, or if the signal 912 indicates a main storage control unit failure, then the judging unit 901 instructs the reception controller 141 so as not to write the received packet in the reception buffer area but to discard it.

The instruction processor monitoring timer 901 is a timer which subtracts "1" from a value set by OS at a constant time interval. When the value set to the timer becomes "0", it is judged that OS cannot operate normally, and the signal 911 is set to indicate an abnormal OS. A normal OS therefore sets the value to the instruction processor monitoring timer 902 before the value becomes "0". This OS operation results in a judgement that OS operates normally.

The main storage control unit failure detector 903 monitors the time period from when the reception controller 141 issues a request for writing packet data to the main storage control unit 114 to when the main storage control unit 114 acknowledges the request. The main storage control unit failure detector 903 sets a value determined by the system and held by the detector 903 to a timer, when the reception controller 141 issues the request for writing packet data to the main storage control unit 114. The set value is subtracted by "1" at a constant time interval. When the value set to the timer becomes "0", it is judged that a failure has occurred in the main storage control unit 114 and the signal 912 is set to indicate a main storage control unit failure. IF the main storage control unit 114 acknowledges the request, the timer is reset and a new request is waited for.

When the instruction processor monitoring timer 902 or main storage control unit failure detector 903 detects an abnormal OS or main storage control unit failure, an interrupt is issued via a signal line 910 to the instruction processor 111.

Even if an interrupt cannot be received by the abnormal operation of OS, or even if a received packet cannot be written in the main storage because of a failure in the main storage control unit, other packet transfers are not intercepted.

Even if there is no space area in the reception buffer area for storing a received packet, or even if a received packet cannot be received because of a failure in the reception processor unit 4, the received packet can be discarded at the reception processor unit, and packet transfers between a number of other processor units cannot be intercepted.

What is claimed is:

1. A parallel processor system, comprising:

a plurality of processor units; and a network for interconnecting said plurality of processor units and transferring packets of data therebetween, each said processor unit comprising:

an instruction processor for executing an instruction;

a main storage for storing instructions and data;

a transmission unit responsive to an instruction of said instruction processor for reading data from said main storage and transmitting said packets to said network, each of said packets containing data and a packet header; and a reception unit for receiving ones of said packets transmitted to said network and writing said received ones of said packets in a reception buffer formed in said main storage, and said reception unit comprising:

a reception buffer controller for judging whether an area of said reception buffer has a space sufficient for storing said received ones of said packets; and a packet discard circuit for discarding said data in said received ones of said packets without writing said data in said reception buffer, if said reception buffer controller judges that said reception buffer has an area of a size insufficient for storing said data in said received ones of said packets; wherein said reception unit includes means for storing an instruction of whether a discard is performed or not, said instruction being capable of being externally set; and said packet discard circuit includes a circuit for discarding said received ones of said packets if said means for storing said instruction of performing a discard.

2. A parallel processor system according to claim 1, wherein said instruction of whether a discard is performed or not is set by said instruction processor.

3. A parallel processor system according to claim 2, further including an operating system (OS) respectively controlling each said instruction processor and wherein said instruction of whether discard is performed or not is set by said instruction processor in response to an instruction issued by said OS.

4. A parallel processor system according to claim 2, wherein said reception unit further includes a packet write suspending circuit for suspending said data in said received ones of said packets until said area is formed in said reception buffer and writing said data in said received ones of said packets in said main storage when said area is formed, if said reception buffer controller judges that said area of said reception buffer has a size sufficient for storing said data in said received ones of said packets and if said stored instruction of whether discard is performed does not indicate discard.

5. A parallel processor system according to claim 3, wherein said reception unit further includes a packet write suspending circuit for suspending said data in said received ones of said packets until said area is formed in said reception buffer and writing said data in said received ones of said packets in said main storage when said area is formed, if said reception buffer controller judges that said area of said reception buffer has a size sufficient for storing said data in said received ones of said packets and if said stored instruction of whether discard is performed does not indicate discard.

6. A parallel processor system according to claim 1, wherein said reception unit further includes a packet write suspending circuit for suspending said data in said received ones of said packets until said area is formed in said reception buffer and writing said data in said received ones of said packets in said main storage when said area is formed, if said reception buffer controller judges that said area of said reception buffer has a size insufficient for storing said data in said received ones of said packets and if said stored instruction of whether discard is performed does not indicate discard.

7. A parallel processor system according to claim 6, further including an operating system (OS) respectively controlling each said instruction processor and wherein:

said reception unit further includes a circuit for issuing an interrupt to said OS, if said reception buffer controller judges that said area of said reception buffer has a size insufficient for storing said data in said received packet, said packet discard circuit includes a circuit for discarding said received ones of said packets in response to when said OS outputs a packet discard instruction in response to said interrupt; and said packet write suspending circuit includes a circuit for suspending writing said data in said received ones of said packets after said interrupt is issued to said OS and until said OS outputs a packet discard instruction or a packet non-discard instruction, releasing a suspension of writing said data if said OS outputs the packet discard instruction in response to said interrupt, and continuing a suspension of writing said data if said OS outputs the packet non-discard instruction in response to said interrupt.

8. A parallel processor system according to claim 1, wherein said reception unit further includes a packet write suspending circuit for suspending said data in said received ones of said packets until said area is formed in said reception buffer and writing said data in said received ones of said packets in said main storage when said area is formed, if said reception buffer controller judges that said area of said reception buffer has a size sufficient for storing said data in said received ones of said packets and if said stored instruction of whether discard is performed does not indicate discard.

9. A parallel processor system, comprising:

a plurality of processor units; and a network for interconnecting said plurality of processor units and transferring packets of data therebetween, each said processor unit comprising:

an instruction processor for executing an instruction;

a main storage for storing instructions and data;

a transmission unit responsive to an instruction of said instruction processor for reading data from said main storage and transmitting said packets to said network, each of said packets containing data and a packet header; and a reception unit for receiving ones of said packets transmitted to said network and writing said received ones of said packets in a reception buffer formed in said main storage, and said reception unit comprising:

a reception buffer controller for judging whether an area of said reception buffer has a space sufficient for storing said received ones of said packets;

a packet discard circuit for discarding said data in said received ones of said packets without writing said data in said reception buffer if said reception buffer controller judges that said reception buffer has an area of a size insufficient for storing said data in said received ones of said packets; and an operating system (OS) respectively controlling each said instruction processor; wherein said reception unit further includes a circuit for issuing an interrupt to said OS if said reception buffer controller judges that said area of said reception buffer has a size insufficient for storing said data in said received packet; and said packet discard circuit includes a circuit for discarding said received ones of said packets in response to when said OS outputs a packet discard instruction in response to said interrupt.

10. A parallel processor system according to claim 9, wherein said reception unit further includes a packet write suspending circuit for suspending said data in said received ones of said packets until said area is formed in said reception buffer and writing said data in said received ones of said packets in said main storage when said area is formed, if said reception buffer controller judges that said area of said reception buffer has a size sufficient for storing said data in said received ones of said packets and if said stored instruction of whether discard is performed does not indicate discard.

11. A parallel processor system, comprising:

a plurality of processor units; and a network for interconnecting said plurality of processor units and transferring packets of data therebetween, each said processor unit comprising:

an instruction processor for executing an instruction;

a main storage for storing instructions and data;

a transmission unit responsive to an instruction of said instruction processor for reading data from said main storage and transmitting said packets to said network, each of said packets containing data and a packet header; and a reception unit for receiving ones of said packets transmitted to said network and writing said received ones of said packets in a reception buffer formed in said main storage, and said reception unit comprising:

a reception buffer controller for judging whether an area of said reception buffer has a space sufficient for storing said received ones of said packets; and a packet discard circuit for discarding said data in said received ones of said packets without writing said data in said reception buffer, if said reception buffer controller judges that said reception buffer has an area of a size insufficient for storing said data in said received ones of said packets; wherein said main storage includes a plurality of reception buffers for storing different types of packets in a discriminating manner; and said reception unit comprises:

means for judging a type of said received ones of said packets and means for selecting one of said plurality of reception buffers in which said received ones of said packets is stored;

a reception buffer controller provided for each said reception buffer for judging, if said reception buffer is selected by said selecting means to be a reception buffer for storing said received ones of said packets, whether said area of said reception buffer has a size sufficient for storing said received packet;

a packet discard circuit for discarding data in said received ones of said packets without writing said data in said selected reception buffer, if said reception buffer controller judges that said selected reception buffer has an area of a size insufficient for storing said data in said received ones of said packets; and a circuit for controlling whether said received ones of said packets is discarded, in accordance with said selected reception buffer.

12. A parallel processor system according to claim 11, further including an operating system (OS) respectively controlling each said instruction processor and wherein said control circuit includes:

a circuit for issuing an interrupt to said OS, if said reception buffer controller judges that said area of said selected reception buffer has a size insufficient for storing said data in said received ones of said packets; and a circuit for supplying said packet discard circuit with one of a packet discard instruction and a packet non-discard instruction outputted by said OS in response to said interrupt.

13. A parallel processor system comprising:

a plurality of processor units; and a network for interconnecting said plurality of processor units and transferring packets of data between arbitrary processor units;

each said processor unit comprising:

an instruction processor for executing an instruction having an operating system for controlling operation of said instruction processor;

a main storage for storing instructions and data;

a transmission unit responsive to an instruction from said instruction processor for reading data from said main storage and transmitting said packets to said network; and a reception unit for writing ones of said packets received from said network into said main storage, said reception unit of each said processor unit comprising:

a discard command bit capable of being set by said instruction processor;

a reception buffer pointer controller for supervising a reception buffer address of a reception buffer formed on said main storage at which received ones of said packets are written and judging whether an area of said reception buffer has a space sufficient to be written with said ones of said packets;

a reception packet discard judging unit for receiving said discard command bit and a notice of presence of said sufficient space in said area in said reception buffer supplied from said reception buffer pointer controller, judging that said received ones of said packets are writable in said reception buffer area if said discard command bit does not indicate discard and if said reception buffer has said sufficient space in said area, judging that said received ones of said packets are not written in said main storage and the operation of said instructions processor stands by while suspending reception of said received ones of said packets if said discard command bit does not indicate discard and if said area of said reception buffer has insufficient space, and judging that said received ones of said packets are not written in said reception buffer area but are discarded if said discard command bit indicates discard; and a circuit for performing a reception process of said received ones of said packets in accordance with a judgment given by said reception packet discard judging unit.

14. A parallel processor system according to claim 13, wherein:

said transmission unit includes means for adding a reception buffer type to ones of said packets to be transmitted; and said reception unit comprises:

a plurality of reception buffer pointer controllers provided in correspondence with reception buffer types;

a plurality of discard command bits provided in correspondence with reception buffer types;

a plurality of received packet discard judging circuits provided in correspondence with reception buffer types;

a circuit for selecting one of said plurality of received packet discard judging circuits corresponding to a reception buffer type of said received ones of said packets; and a circuit for performing a reception process of said received ones of said packets in accordance with a judgment given by said selected received packet discard judging circuit.

15. A parallel processor system according to claim 13, wherein each said reception unit of said processor unit is provided with a reception process failure detector for detecting that the reception process cannot be performed normally and a received packet discard judging circuit for discarding said received ones of said packets without writing said received ones of said packets in said reception buffer area if said reception process failure detector detects a failure.

16. A packet discard method for a parallel processor system including a plurality of processor units and a network for interconnecting said plurality of processor units and transferring packets of data between arbitrary processor units alternately functioning in transmission and reception of said packets of data, each said processor unit including an instruction processor for executing an instruction, a main storage for storing instructions and data, a transmission unit responsive to an instruction from said instruction processor for reading data from said main storage and transmitting said data as said packets to said network, each of said packets including said data and a packet header, and a reception unit for writing received ones of said packets from said network into said main storage, said packet discard method comprising the steps of:

receiving ones of said packets transferred from a transmission one of said processor units at a reception one of said processor units;

judging whether said reception processor unit has an area of sufficient space for storing data in said received ones of said packets;

issuing an interrupt to an operating system (OS) which controls said reception processor unit if it is judged that said area has insufficient space for storing said data in said received ones of said packets;

judging with said OS whether said received ones of said packets are to be discarded; and discarding said received ones of said packets if said OS judges that said received ones of packets are to be discarded;

wherein said OS judges whether said received ones of said packets satisfy a certain packet discard condition, and in accordance with said judgment result, judges whether said received ones of said packets are to be discarded.

17. A packet discard method for a parallel processor system including a plurality of processor units and a network for interconnecting said plurality of processor units and transferring packets of data between arbitrary processor units alternately functioning in transmission and reception of said packets of data, each said processor unit including an instruction processor for executing an instruction, a main storage for storing instructions and data, a transmission unit responsive to an instruction from said instruction processor for reading data from said main storage and transmitting said data as said packets to said network, each of said packets including said data and a packet header, and a reception unit for writing received ones of said packets from said network into said main storage, said packet discard method comprising the steps of:

receiving ones of said packets transferred from a transmission one of said processor units at a reception one of said processor units;

judging whether said reception processor unit has an area of sufficient space for storing data in said received ones of said packets;

issuing an interrupt to an operating system (OS) which controls said reception processor unit if it is judged that said area has insufficient space for storing said data in said received ones of said packets;

judging with said OS whether said received ones of said packets are to be discarded; and discarding said received ones of said packets if said OS judges that said received ones of said packets are discarded;

wherein said certain packet discard condition includes a condition regarding a type of said received ones of said packets.

18. A packet discard method for a parallel processor system including a plurality of processor units and a network for interconnecting said plurality of processor units and transferring packets of data between arbitrary processor units alternately functioning in transmission and reception of said packets of data, each said processor unit including an instruction processor for executing an instruction, a main storage for storing instructions and data, a transmission unit responsive to an instruction from said instruction processor for reading data from said main storage and transmitting said data as said packets to said network, each of said packets including said data and a packet header, and a reception unit for writing received ones of said packets from said network into said main storage, said packet discard method comprising the steps of:

receiving ones of said packets transferred from a transmission one of said processor units at a reception one of said processor units;

judging whether said reception processor unit has an area of sufficient space for storing data in said received ones of said packets;

issuing an interrupt to an operating system (OS) which controls said reception processor unit if it is judged that said area has insufficient space for storing said data in said received ones of said packets;

judging with said OS whether said received ones of said packets are to be discarded; and discarding said received ones of said packets if said OS judges that said received ones of said packets are discarded;

wherein if said OS judges that said received ones of said packets are not discarded, said received ones of said packets are held in said reception unit of said reception processor unit until said area has sufficient space.

\* \* \* \* \*